United States Patent
Rindsberg et al.

(10) Patent No.: US 8,803,672 B2
(45) Date of Patent: Aug. 12, 2014

(54) VEHICLE MESSAGE ADDRESSING

(75) Inventors: Mark Rindsberg, Boca Raton, FL (US); Paul Marko, Pembrokes Pines, FL (US)

(73) Assignee: Sirius XM Radio Inc., New York, NY (US)

( * ) Notice: Subject to any disclaimer, the term of this patent is extended or adjusted under 35 U.S.C. 154(b) by 1095 days.

(21) Appl. No.: 12/120,877

(22) Filed: May 15, 2008

(65) Prior Publication Data

US 2008/0287092 A1 Nov. 20, 2008

Related U.S. Application Data

(60) Provisional application No. 60/938,131, filed on May 15, 2007.

(51) Int. Cl.
*B60R 25/10* (2013.01)
(52) U.S. Cl.
USPC ....... 340/426.16; 340/988; 340/989; 340/5.1; 340/7.46; 340/7.35
(58) Field of Classification Search
CPC . G06F 3/017; H04W 88/022; G07C 9/00309; G08G 1/205; B60R 25/102
USPC ............ 340/7.35, 7.46, 5.1, 426.16, 988, 989
See application file for complete search history.

(56) References Cited

U.S. PATENT DOCUMENTS

| | | | | |
|---|---|---|---|---|
| 1,900,409 A * | 3/1933 | Sorensen | ..................... | 246/63 C |
| 4,989,144 A * | 1/1991 | Barnett, III | ..................... | 705/29 |
| 5,260,700 A * | 11/1993 | Merchant et al. | ............. | 340/7.22 |
| 5,282,028 A * | 1/1994 | Johnson et al. | ............... | 725/139 |
| 5,365,497 A * | 11/1994 | Born | ............................ | 368/230 |
| 5,455,570 A * | 10/1995 | Cook et al. | ................... | 340/3.71 |
| 5,463,374 A * | 10/1995 | Mendez et al. | .............. | 340/442 |
| 5,535,439 A * | 7/1996 | Katz | .............................. | 455/117 |
| 5,684,859 A * | 11/1997 | Chanroo et al. | ............. | 455/433 |
| 5,717,387 A | 2/1998 | Suman et al. | | |
| 5,798,656 A * | 8/1998 | Kean | .............................. | 326/39 |
| 5,870,018 A * | 2/1999 | Person et al. | .................. | 340/5.65 |
| 5,973,611 A * | 10/1999 | Kulha et al. | .................. | 340/5.62 |
| 5,991,673 A * | 11/1999 | Koopman et al. | .............. | 701/32 |
| 6,028,537 A | 2/2000 | Suman et al. | | |

(Continued)

FOREIGN PATENT DOCUMENTS

EP 1352788 A2 10/2003
EP 1641156 A2 3/2006

(Continued)

*Primary Examiner* — George Bugg
*Assistant Examiner* — Paul Obiniyi
(74) *Attorney, Agent, or Firm* — Kramer Levin Naftalis & Frankel

(57) ABSTRACT

A vehicle messaging method (600) and system (100) can include any number of data sources (101-103), an interface (104) that formats messages and addresses from the data sources, and a corresponding number of messaging servers (111-113) that receive targeted messages intended for a predetermined subset of subscribers associated with a vehicle identification number (VIN). Each messaging server can include a corresponding controller (121-123) programmed to assign (604) targeted messages to a predetermined channel and encode (606) the addresses of the targeted messages to the predetermined subset of subscribers using a VIN or portion thereof. The controller can be further programmed to transfer (608) the targeted messages and addresses to a satellite uplink (107) and satellite (110) via a messaging uplink interface (106) for retransmission and reception by a plurality of selective call receivers 109 addressable individually using a predetermined VIN or portion thereof.

10 Claims, 6 Drawing Sheets

(56) References Cited

U.S. PATENT DOCUMENTS

| | | | |
|---|---|---|---|
| 6,044,250 A * | 3/2000 | Kuramatsu et al. | 340/7.4 |
| 6,175,557 B1 * | 1/2001 | Diachina et al. | 370/313 |
| 6,181,313 B1 * | 1/2001 | Yokota et al. | 345/100 |
| 6,259,362 B1 * | 7/2001 | Lin | 340/457 |
| 6,298,038 B1 * | 10/2001 | Martin et al. | 370/216 |
| 6,320,514 B1 * | 11/2001 | Flick | 340/12.28 |
| 6,397,131 B1 * | 5/2002 | Busch et al. | 701/31.6 |
| 6,420,967 B1 * | 7/2002 | Ghabra et al. | 340/447 |
| 6,445,916 B1 * | 9/2002 | Rahman | 455/423 |
| 6,696,983 B2 * | 2/2004 | Tang et al. | 340/989 |
| 6,731,959 B1 * | 5/2004 | Kumagai et al. | 455/575.3 |
| 6,809,638 B2 * | 10/2004 | Lin | 340/447 |
| 6,819,229 B2 * | 11/2004 | Ghabra et al. | 340/426.36 |
| 6,853,910 B1 | 2/2005 | Oesterling et al. | |
| 7,062,286 B2 * | 6/2006 | Grivas et al. | 455/518 |
| 7,085,585 B2 * | 8/2006 | Camarillo et al. | 455/550.1 |
| 7,120,473 B1 * | 10/2006 | Hawkins et al. | 455/575.1 |
| 7,136,678 B2 * | 11/2006 | Eiden | 455/567 |
| 7,142,810 B2 * | 11/2006 | Oesterling | 455/9 |
| 7,161,485 B2 * | 1/2007 | Melman | 340/539.18 |
| 7,248,201 B2 * | 7/2007 | Buccina et al. | 341/176 |
| 7,292,848 B2 * | 11/2007 | Mazzara et al. | 455/419 |
| 7,526,246 B2 * | 4/2009 | Videtich | 455/3.06 |
| 7,532,859 B2 * | 5/2009 | Videtich | 455/12.1 |
| 7,573,809 B2 * | 8/2009 | Meagher et al. | 370/216 |
| 7,613,435 B2 * | 11/2009 | Reynolds et al. | 455/152.1 |
| 7,894,861 B2 * | 2/2011 | Grivas et al. | 455/569.2 |
| 8,036,875 B2 * | 10/2011 | Nakashima et al. | 704/3 |
| 2002/0034220 A1 * | 3/2002 | Duxbury | 375/222 |
| 2002/0037740 A1 * | 3/2002 | Noda et al. | 455/550 |
| 2002/0073000 A1 | 6/2002 | Sage | |
| 2002/0084887 A1 * | 7/2002 | Arshad et al. | 340/5.61 |
| 2002/0107010 A1 * | 8/2002 | Witte et al. | 455/418 |
| 2002/0109587 A1 * | 8/2002 | Attring et al. | 340/426 |
| 2003/0081767 A1 * | 5/2003 | Montague | 379/433.07 |
| 2003/0098782 A1 * | 5/2003 | Eastman et al. | 340/7.46 |
| 2003/0117267 A1 * | 6/2003 | Tang et al. | 340/5.72 |
| 2003/0154094 A1 * | 8/2003 | Bredemeier et al. | 705/1 |
| 2003/0188303 A1 * | 10/2003 | Barman et al. | 717/170 |
| 2003/0202087 A1 * | 10/2003 | Izumi et al. | 348/14.02 |
| 2003/0231131 A1 * | 12/2003 | Dimig et al. | 341/176 |
| 2004/0036589 A1 * | 2/2004 | Lin | 340/445 |
| 2004/0108994 A1 * | 6/2004 | Kato | 345/171 |
| 2004/0125074 A1 * | 7/2004 | Lin | 345/156 |
| 2004/0125947 A1 * | 7/2004 | Charlier et al. | 379/433.07 |
| 2004/0142659 A1 * | 7/2004 | Oesterling | 455/11.1 |
| 2004/0192374 A1 * | 9/2004 | Camarillo et al. | 455/550.1 |
| 2004/0203340 A1 * | 10/2004 | Oesterling | 455/9 |
| 2004/0209601 A1 | 10/2004 | Obradovich et al. | |
| 2004/0252227 A1 * | 12/2004 | Seo | 348/375 |
| 2005/0052277 A1 * | 3/2005 | Rodriguez et al. | 340/5.72 |
| 2005/0073432 A1 * | 4/2005 | Melman | 340/902 |
| 2005/0130723 A1 * | 6/2005 | Grivas et al. | 455/575.9 |
| 2005/0134448 A1 * | 6/2005 | Perlman et al. | 340/468 |
| 2005/0134477 A1 * | 6/2005 | Ghabra et al. | 340/825.72 |
| 2005/0136890 A1 * | 6/2005 | Lippelt | 455/406 |
| 2005/0221851 A1 * | 10/2005 | Grivas et al. | 455/518 |
| 2005/0270396 A1 * | 12/2005 | Miyashita et al. | 348/333.01 |
| 2005/0272368 A1 | 12/2005 | Langsenkamp et al. | |
| 2006/0046649 A1 * | 3/2006 | Videtich | 455/12.1 |
| 2006/0068700 A1 * | 3/2006 | Habaguchi et al. | 455/7 |
| 2006/0083236 A1 * | 4/2006 | Rachwalski et al. | 370/389 |
| 2006/0089097 A1 * | 4/2006 | Wang et al. | 455/3.02 |
| 2006/0091997 A1 * | 5/2006 | Conner et al. | 340/5.64 |
| 2006/0139333 A1 * | 6/2006 | Park | 345/169 |
| 2006/0202881 A1 * | 9/2006 | Buccinna et al. | 341/176 |
| 2006/0224306 A1 * | 10/2006 | Workman et al. | 701/207 |
| 2007/0021054 A1 * | 1/2007 | Videtich | 455/3.06 |
| 2007/0106454 A1 | 5/2007 | Nonaka | |
| 2007/0219822 A1 * | 9/2007 | Godwin et al. | 705/2 |
| 2007/0230915 A1 * | 10/2007 | Nijjer et al. | 386/107 |
| 2007/0234231 A1 * | 10/2007 | Lee | 715/788 |
| 2007/0298737 A1 * | 12/2007 | Reynolds et al. | 455/152.1 |
| 2008/0064324 A1 * | 3/2008 | Nix | 455/3.02 |
| 2008/0102854 A1 * | 5/2008 | Yi et al. | 455/456.1 |
| 2008/0194236 A1 * | 8/2008 | Johns | 455/412.2 |
| 2010/0098345 A1 * | 4/2010 | Andersson et al. | 382/238 |

FOREIGN PATENT DOCUMENTS

| | | | | |
|---|---|---|---|---|
| GB | 2378617 A | * | 2/2003 | G08B 6/00 |
| JP | 02170596 A | * | 7/1990 | H05K 5/02 |
| JP | 2006024237 A | * | 1/2006 | |
| WO | WO 0122707 A1 | * | 3/2001 | H04M 3/533 |

* cited by examiner

MESSAGING - VIN MATCHING

Description of VIN -

| World Manufacturer ID | Vehicle Descriptor Section | Vehicle ID Section |
|---|---|---|
| WMI | VDS | VIS |

| Country | Manufacturer | Type | | | | | | Check Digit | Year Code | Plant | | | | | | |
|---|---|---|---|---|---|---|---|---|---|---|---|---|---|---|---|---|
| C | M | T | | | | | | CD | YC | P | | | | | | |
| P1 | P2 | P3 | P4 | P5 | P6 | P7 | P8 | P9 | P10 | P11 | P12 | P13 | P14 | P15 | P16 | P17 |
| | | | | | | | | | | | SEQUENCE NUMBER | | | | | |

Specific Example:

| | | | | | | | | | | | 24-bit left mask follows | 24-bit left mask | range follows | Start of range | End of range |
|---|---|---|---|---|---|---|---|---|---|---|---|---|---|---|---|
| 1 | N | 59 | D | 7 | 62 | 62 | 62 | 62 | 6 | 62 | | 0xE03800 | 2 | 105024 | 122354 |

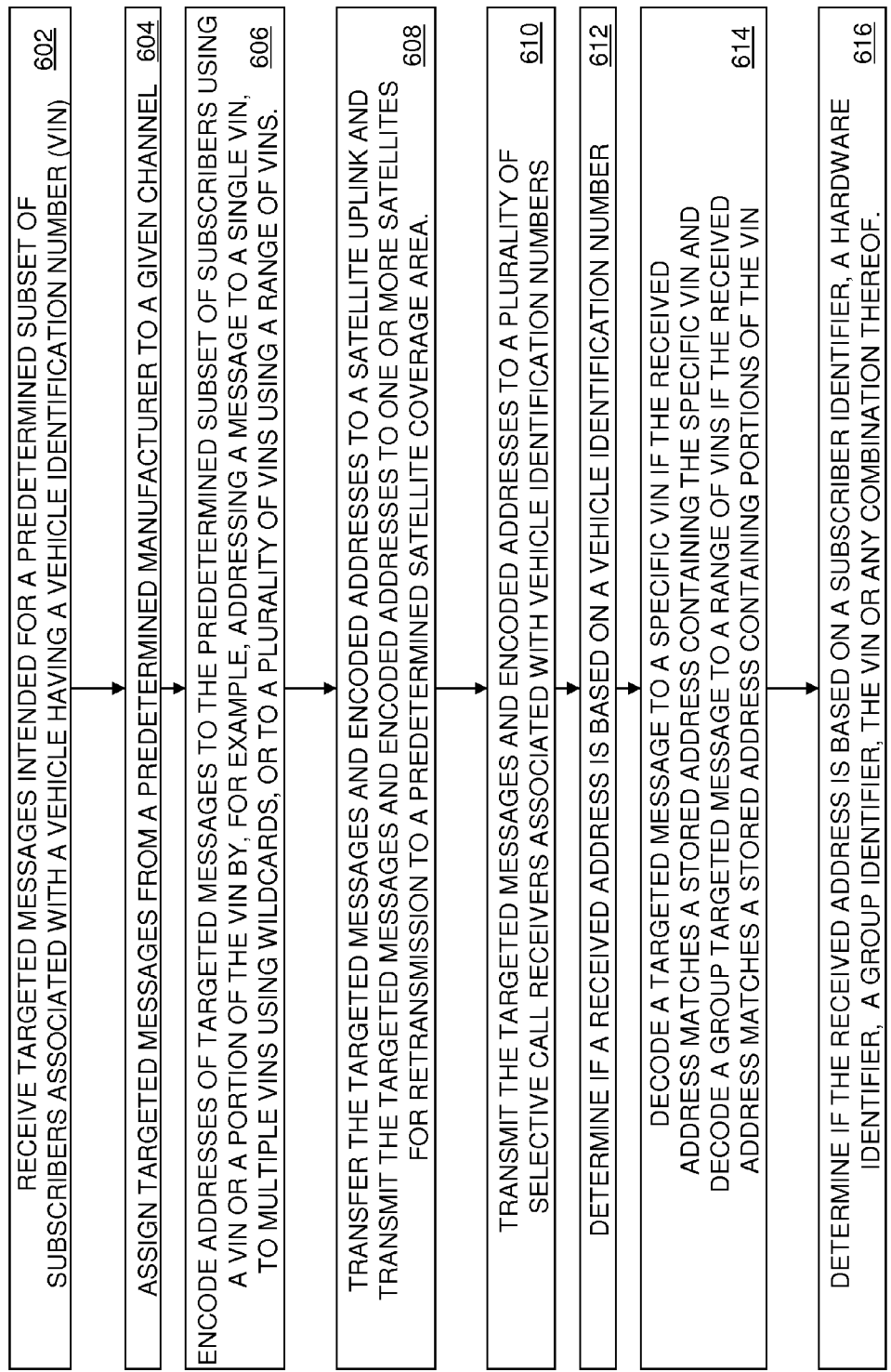

VEHICLE MESSAGE ADDRESSING

CROSS-REFERENCE TO RELATED APPLICATIONS

This application claims priority to U.S. Provisional Patent Application No. 60/938,131, filed May 15, 2007, which is hereby incorporated by reference herein in its entirety.

FIELD OF THE INVENTION

The invention relates generally to methods and systems for addressing vehicles, and more particularly to methods systems for addressing a vehicle using vehicle identification numbers or VINs.

BACKGROUND OF THE INVENTION

Satellite radio currently offers well over a hundred channels of content over a large geographic footprint. A large portion of satellite radios is pre-installed in current model vehicles without any means of addressing or targeting a particular vehicle or a particular class of vehicles.

SUMMARY OF THE INVENTION

Addressing or targeting vehicles with wireless messages using a vehicle identification number (VIN) or a portion of the VIN as part of the communication address can enable numerous applications particularly useful for the automotive industry among other industries.

In accordance with a first embodiment of the present invention, a vehicle messaging device can include a selective call receiver (such as a satellite digital audio radio) and a decoder coupled to the selective call receiver. The decoder can be programmed to determine if a received address is based on a vehicle identification number, decode a targeted message to a specific vehicle identification number if the received address matches a stored address containing the specific vehicle identification number, and decode a group targeted message to a range of vehicle identification numbers if the received address matches a stored address containing portions of the vehicle identification number. The decoder can be further programmed to decode a broadcast message to all vehicles if the received address has wildcard data that matches a stored address. The stored address can be pre-stored in the vehicle messaging device or can be retrieved over a vehicle's communication bus from a remote memory. The decoder can be further programmed to determine if the received address is based on a subscriber identifier, a hardware identifier, a group identifier, the vehicle identification number or any combination thereof. The vehicle messaging device can be addressed with a message to a single vehicle identification number, to multiple vehicle identification numbers using wildcards, or a plurality of vehicle identification numbers using a range of vehicle identification numbers. The targeted message or group targeted message can be a command and control message, a service message, a service authorization message, a software or firmware update, a file download, a text message, an audio message, an image, or a video.

In a second embodiment, a vehicle messaging system can include a messaging server receiving targeted messages intended for a predetermined subset of subscribers associated with a vehicle having a vehicle identification number and a controller coupled to the messaging server. The controller can be programmed to assign targeted messages from a predetermined manufacturer to a predetermined channel and encode the addresses of the targeted messages to the predetermined subset of subscribers using a vehicle identification number or a portion of the vehicle identification number. The controller can be further programmed to transfer the targeted messages and encoded addresses to a satellite uplink for transmission of the targeted messages and encoded addresses to one or more satellites for retransmission to a predetermined satellite coverage area. The system can further include a plurality of selective call receivers addressable individually using a predetermined vehicle identification number or addressable in predetermined groups using a portion of a vehicle identification number. The selective call receivers can be satellite digital audio radio receivers, although embodiments herein are not limited to such receivers. The plurality of selective call receivers can each include a decoder coupled to a selective call receiver. The decoder can be programmed to determine if a received address is based on the vehicle identification number, decode a targeted message to a specific vehicle identification number if the received address matches a stored address containing the specific vehicle identification number, and decode a group targeted message to a range of vehicle identification numbers if the received address matches a stored address containing portions of the vehicle identification number.

In a third embodiment, a method of vehicle message addressing can include the steps of receiving targeted messages intended for a predetermined subset of subscribers associated with a vehicle having a vehicle identification number, assigning targeted messages from a predetermined manufacturer to a predetermined channel, and encoding the addresses of the targeted messages to the predetermined subset of subscribers using a vehicle identification number or a portion of the vehicle identification number. The method can further include the step of transferring the targeted messages and encoded addresses to a satellite uplink and transmitting the targeted messages and encoded addresses to one or more satellites for retransmission to a predetermined satellite coverage area.

The method can further include the steps of transmitting the targeted messages and encoded addresses to a plurality of selective call receivers associated with vehicle identification numbers, determining if a received address is based on a vehicle identification number, decoding a targeted message to a specific vehicle identification number if the received address matches a stored address containing the specific vehicle identification number, and decoding a group targeted message to a range of vehicle identification numbers if the received address matches a stored address containing portions of the vehicle identification number. Decoding a broadcast message to all vehicles in one example can be done if the received address has wildcard data that matches a stored address. As noted above, the VIN can be stored locally or optionally obtained via a vehicle's communication bus. The method can further include the step of determining if the received address is based on a subscriber identifier, a hardware identifier, a group identifier, the vehicle identification number or any combination thereof. Note, the step of encoding can be done by addressing a message to a single vehicle identification number, to multiple vehicle identification numbers using single or multiple wildcards, or to a plurality of vehicle identification numbers using a range of vehicle identification numbers.

BRIEF DESCRIPTION OF THE DRAWINGS

FIG. 4 is an illustration showing a VIN addressing architecture in accordance with one embodiment of the present invention.

FIG. 6 is a flow chart illustrating a method of VIN addressing in accordance with an embodiment of the present invention.

DETAILED DESCRIPTION OF THE DRAWINGS

Figure 1:
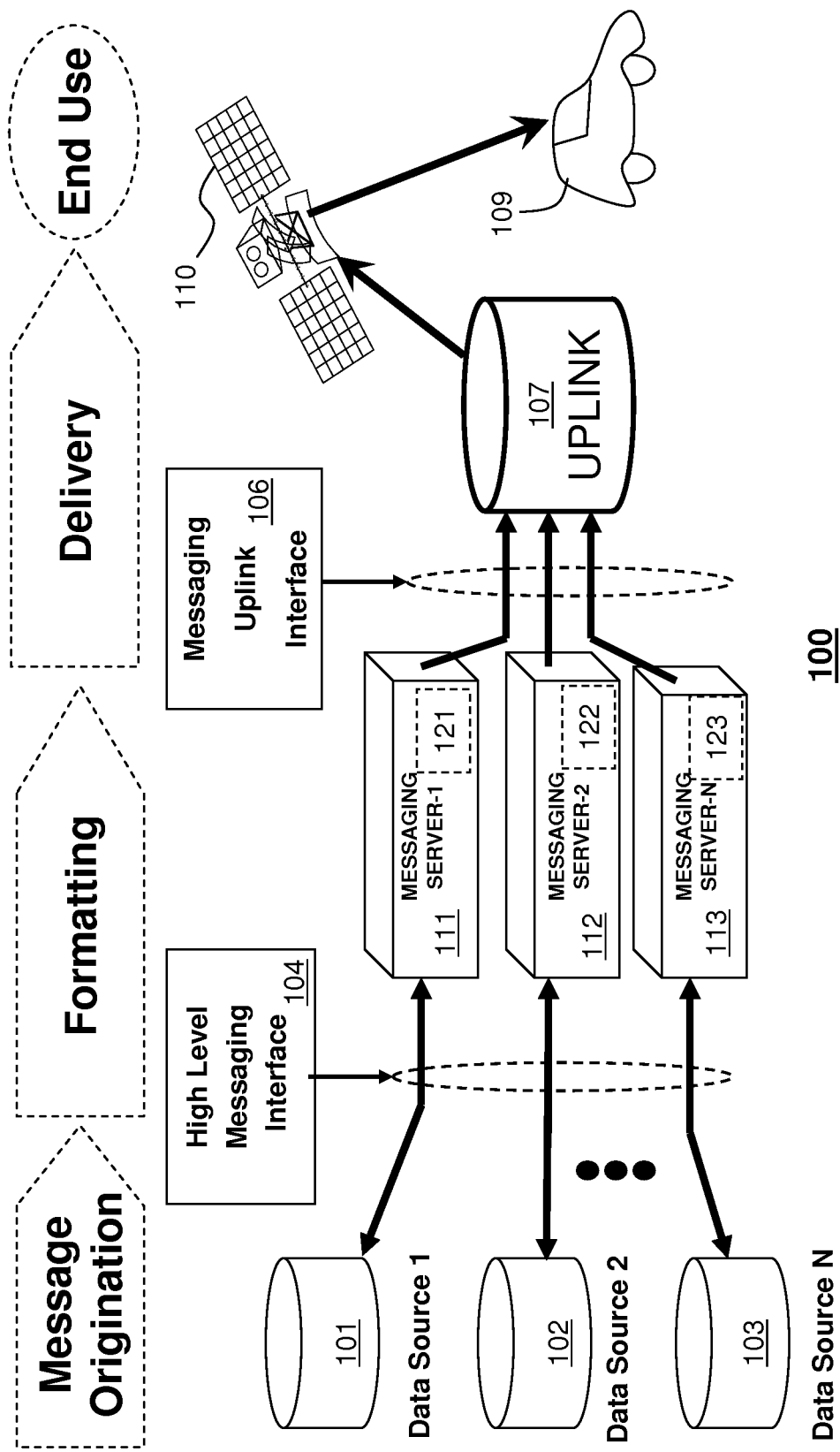
FIG. 1 is block diagram of vehicle messaging system in accordance with an embodiment of the present invention.

Satellite radio operators are providing digital radio broadcast services covering the entire continental United States with the hope of further covering other areas of the Americas. These services offer approximately 100 channels, of which nearly 50 channels in a typical configuration provides music with the remaining stations offering news, sports, talk and data channels. Briefly, the service provided by XM Satellite Radio includes a satellite X-band uplink to two satellites which provide frequency translation to the S-band for re-transmission to radio receivers on earth within a coverage area. Radio frequency carriers from one of the satellites are also received by terrestrial repeaters. The content received at the repeaters is retransmitted at a different S-band carrier to the same radios that are within their respective coverage areas. These terrestrial repeaters facilitate reliable reception in geographic areas where Geosynchronous Satellite reception is obscured by tall buildings, hills or other natural obstructions, tunnels, or other obstructions. The signals transmitted by the satellites and the repeaters are received by satellite digital audio radio system (SDARS) receivers which can be located in automobiles, in handheld or in stationary units for home or office use. The SDARS receivers are designed to receive one or both of the satellite signals and the signals from the terrestrial repeaters and combine or select one of the signals as the receiver output.

Each SDARS receiver contains a unique Hardware Identification number (HWID), which is assigned during the manufacturing process and is used by SDARS Service Providers to enable or disable the radio to receive subscribed services, such as music and talk programming. In addition, these subscribed services could include data services, such as weather and traffic data feeds or other custom data feeds. The custom data feeds are typically uniquely enabled by the SDARS Service Provider for select subscriber groups, which may include owners of a specific manufacturer's vehicles.

Since the SDARS receivers are assigned their HWIDs during the separate receiver manufacturing process and are not ordered by HWID during the vehicle manufacturing process, each sequential Vehicle Identification Number (VIN) assigned during the vehicle manufacturing process will have associated with it a relatively random HWID. With this random relationship between HWIDs and VINS, in order to address a message to a range of VINs using the SDARS receiver HWID would require an individual message to be sent to each HWID in the VIN range, which would result in very inefficient use of bandwidth.

Although existing telematics systems using cellular and Global Positioning System (GPS) technology, such as the On-Star system, currently track vehicles and provide services such as dispatching emergency road side assistance upon detection of certain detected events at the vehicle, no existing system is able to address a single vehicle or a selected group of vehicles in a targeted fashion using a vehicle identification number as part of an addressing scheme in a comprehensive manner suitable for both consumers and manufacturers of such vehicles.

Referring to FIG. 1, a vehicle messaging system 100 can include a message originating portion, a message formatting portion, a delivery system portion, and an end-user portion. The message origination portion can include any number of data sources (101, 102, through 103) that can be represented in a real world example by any number of databases controlled or operated by vehicle manufacturers. The formatting portion of system 100 can include a high level messaging interface 104 that formats messages and addresses from the data sources (101-103) as well as a corresponding number of messaging servers 111, 112 through 113 that receive targeted messages intended for a predetermined subset of subscribers associated with a vehicle having a vehicle identification number. Each messaging server 111, 112, or 113 can include a corresponding controller 121, 122, or 123 coupled to the messaging server. The controller can be programmed to assign targeted messages from a predetermined manufacturer to a predetermined channel and encode the addresses of the targeted messages to the predetermined subset of subscribers using a vehicle identification number or a portion of the vehicle identification number. The controller can be further programmed to transfer the targeted messages and encoded addresses to delivery system including a satellite uplink 107 via a messaging uplink interface 106. The satellite uplink 107 can transmit the targeted messages and encoded addresses to one or more satellites (110) for retransmission to a predetermined satellite coverage area that can have a nationwide or multinational or multi-continental footprint. The system can further include a plurality of selective call receivers 109 addressable individually using a predetermined vehicle identification number or addressable in predetermined groups using a portion of a vehicle identification number. The selective call receivers can be satellite digital audio radio receivers used by end users, although embodiments herein are not limited to such receivers.

The architecture presented can also provide a double or two-layer protection against mistaken delivery of targeted messages. Data from a first data source is protected from being delivered to another data source target. The first layer of protection can involve a dedicated messaging and data channel per data source or car manufacturer in an automobile scenario. The second layer of protection can involve checking the message VIN address to determine if a particular vehicle or class of vehicles is the target for a message. Only if the VIN address is a target address is the decrypted message payload sent via a data channel to a host processor in a vehicle radio, for instance.

Figure 2:
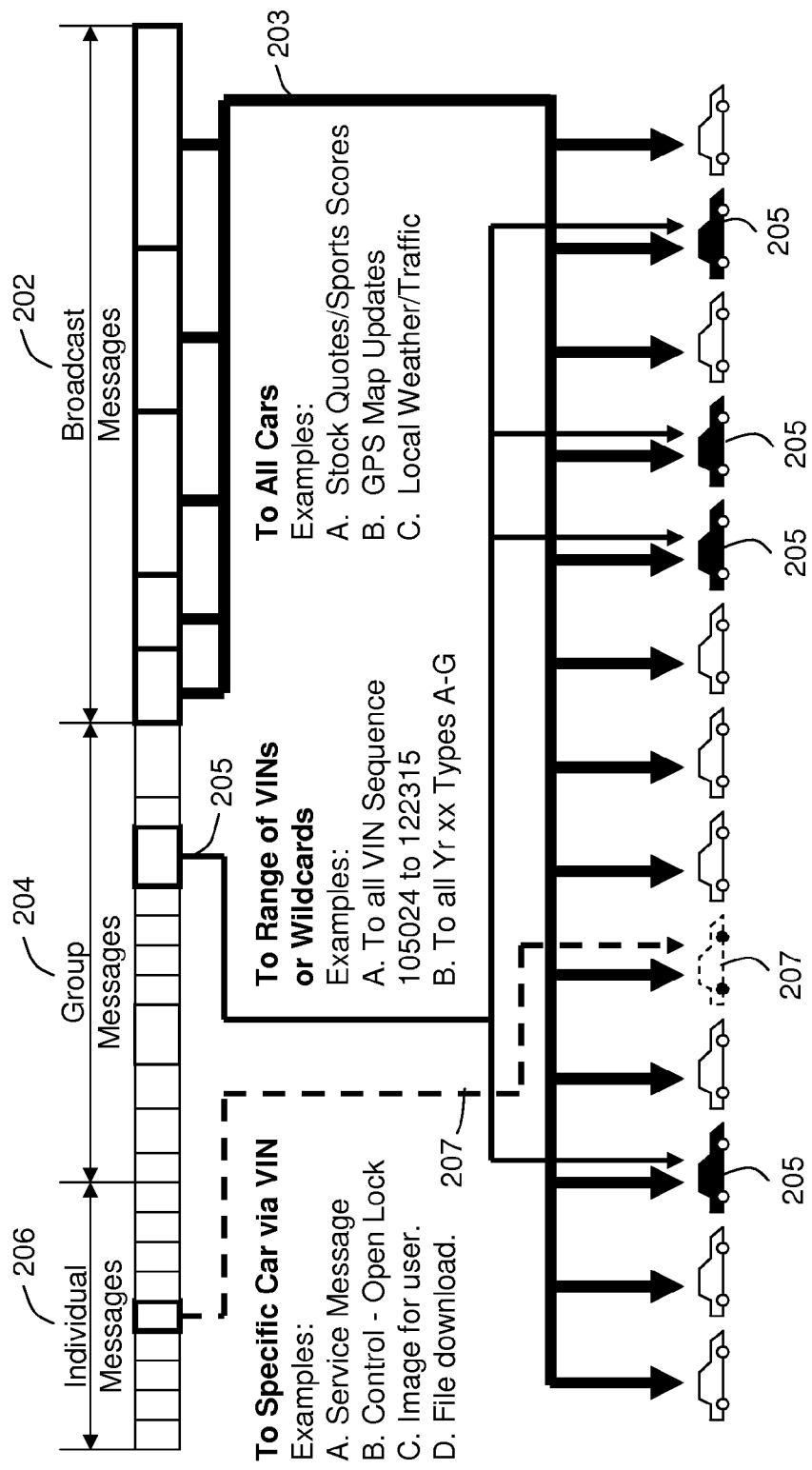
FIG. 2 is an illustration of how messages are targeted to either a specific VIN, a range of VINs, or to all cars in accordance with an embodiment of the present invention.

Referring to FIG. 2, an illustration of how messages can be targeted to either an individual VIN, to a group of VINs or to all end users regardless of VIN is provided. In one example, a particular address type can include broadcast messages 202 that would be received and decoded by all end users 203 having any VIN. In a broader embodiment, a broadcast message 202 can be received and decoded by not just end users having a VIN, but all users regardless of whether they have a VIN associated with their address or not. The broadcast message 202 can include stock quotes, sports scores, navigation system map updates such as additional points of interest (POI), local weather or local traffic, as examples. In another example, the particular address type can include group messages 204 that can be addressed to a particular subset of end users 205 having VINs. The group messages 204 can be addressed, for example, to devices having a range of VINs or using wildcards in portions of the VINs. For example, a group message can be addressed to VINs in a sequence from 105024 to 122315. In another example, the group message can be addressed to VINs in year "XX" having types "A-G", where "XX" designates a wildcard for any year. The group message can be particularly useful for vehicle recall messages, customer alerts, or similar information, as messages can be addressed using wildcards to a specific model (or group of models) in a specific year or range of years. In yet another example, the particular address type can include individual messages 206 targeted to an individual or specific car 207 having a specific VIN. The individual message 206 can be a service message (reminders for oil service, tire rotation, new tires, etc.), a control message (to open a lock, to safely disable an ignition, to govern speed or gas intake, etc.), or images or download files sent to a particular address indicated by a VIN.

Figure 3:
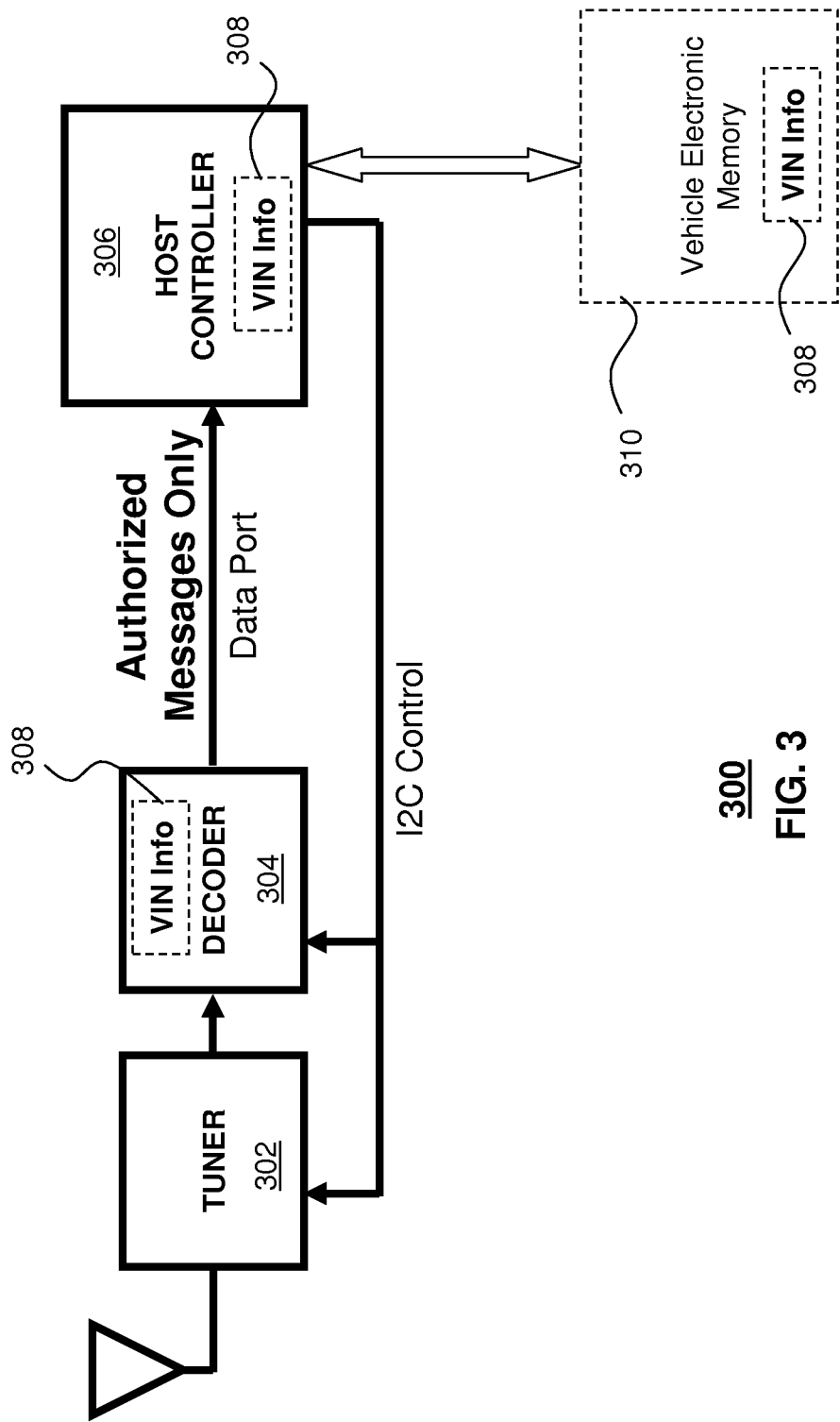
FIG. 3 is a block diagram of a receiver unit using VIN addressing in accordance with an embodiment of the present invention.

The plurality of selective call receivers can each include a decoder coupled to a selective call receiver. Referring to FIG. 3, a receiver unit 300 can include a tuner or receiver 302 coupled to a decoder 304. The decoder 304 can be programmed to determine if a received address is based on the vehicle identification number 308, decode a targeted message to a specific vehicle identification number if the received address matches a stored address containing the specific vehicle identification number, and decode a group targeted message to a range of vehicle identification numbers if the received address matches a stored address containing portions of the vehicle identification number. The aforementioned decoder function can occur at the decoder 304, or alternatively, can occur at a host controller 306. The VIN information used for matching with the received address can be stored in the decoder 304 or the controller 306, or alternatively, in a remote location such as in a vehicle's electronic memory 310. Access to such VIN information from the vehicle can be made available over the vehicle's communication bus.

Referring to FIG. 4, a VIN addressing or matching architecture or scheme 400 is illustrated. A VIN addressing scheme can be devised in various ways, but using some of the existing VIN specific fields can enable logical group addressing schemes. A VIN address description includes a first section having a World Manufacturer Identifier (WMI), a second section having a Vehicle Descriptor Section (VDS) that might indicate a model, and a Vehicle Identifier Section (VIS). Each of these sections can have subsections. For example, the WMI can include a country field, manufacturer field, and a type field. The VIS can include a year code field, a plant field, and a sequence number. The standardized Vehicle Identification Number, or VIN, was mandated by Federal legislation and regulations, and must appear on all vehicles manufactured after 1980.

More specifically, the VIN contains six sections: (1) The World Manufacturer Identification, or WMI, identifies the country and company that assembled the vehicle. In the United States, the WMI is assigned by the Society for Automotive Engineering (SAE); (2) The model year of the vehicle, using a single-letter code is standardized for all manufacturers; (3) The model description, in a format chosen by the manufacturer; (4) The manufacturing plant, in a format chosen by the manufacturer; (5) The serial number of the vehicle, in a format chosen by the manufacturer; and (6) a check digit used to validate the VIN's validity. The check digit is calculated using an algorithm which is standardized for all manufacturers. The position of each VIN component within the VIN is also standardized:

| 1 2 3 | 4 5 6 7 8 | 9 | 10 | 11 | 12 13 14 15 16 17 |
|---|---|---|---|---|---|
| WMI | Model | Check Digit | Yr | Plant | Serial |

Where:
The positions 1-3 of the VIN covers the WMI, positions 4-8 covers the model of the vehicle, position 9 is the check digit, position 10 is the year code, position 11 is the plant code, and positions 12-17 cover the serial number.

In one arrangement as illustrated in FIG. 4, each field of P1 through P11 can be stored in 6 bits which allows 64 possible values—
0-32: specify an exact match of that field.
33-57: RFU
58: mask 33 bits (values 0-9, A-Z)-33 bit field follows (2 words)
59: mask 24 bits left (values 0-9, A-P)-24 bit field follows (1 word)
60: mask 24 bits center (values 6-9, A-Y)-24 bit field follows (1 word)
61: mask 24 bits right (values 9, A-Z)-24 bit field follows (1 word)
62: current field is wildcard—nothing follows remaining fields
63: all subsequent fields are wildcard—nothing follows, all remaining fields are deleted
Please note that for all the masks described above, the characters 'I', 'O', and 'Q' are excluded from the character set (for VINs) thereby resulting in a maximum of 33 used characters.

For Sequence Number (P12 through P17), the entire 6 fields can be represented by a number stored in 20 bits—
A 2-bit value will specify how Sequence Number is matched—
0: Wildcard, nothing follows
1: Single match, a single 20-bit value follows
2: Range, two 20-bit values follow (start of range and end of range)
3: Range starting at zero, one 20-bit value follows (end of range)
20-bit values—
0-999,999: match value or start/end of range.
1000000-1048576: RFU The particular example illustrated in FIG. 4 using this scheme can have this match string match all WMI=1N0, 1N1, 1N2, 1NA, 1NB, 1NC, vehicle descriptor fields D7XXX (where X are wildcards), model year 2006, with sequence numbers between 105,024 and 122,354.

Figure 5:
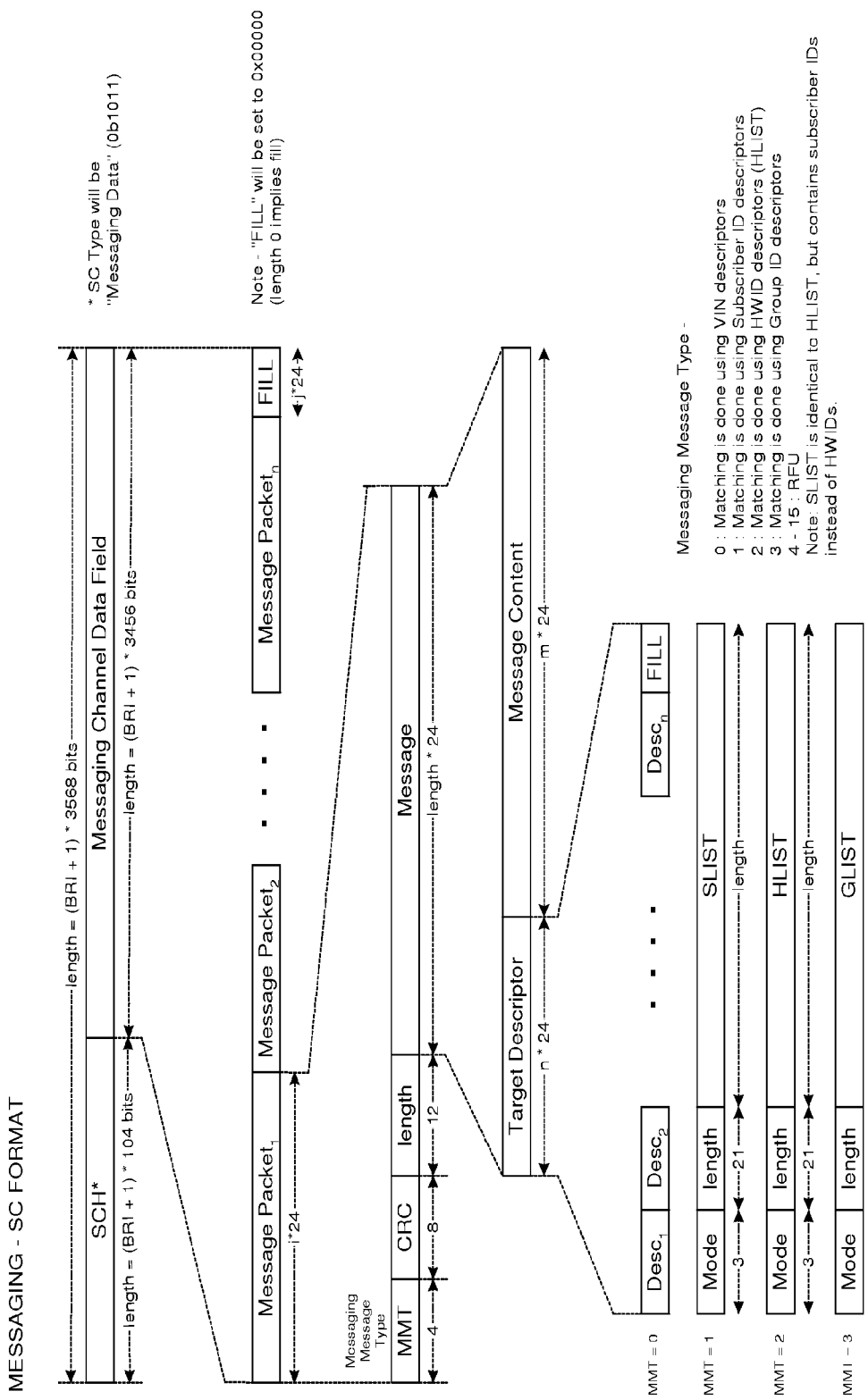
FIG. 5 is an illustration showing another VIN addressing architecture in accordance with an embodiment of the present invention.

Within a messaging format 500 as illustrated in FIG. 5, the VIN matching address can reside within a messaging channel data field and within a message packet that can designate the message type as a VIN addressed message among other types of addressed messages. As noted, the messaging types can include a type using VIN descriptors, subscriber ID descriptors, hardware ID descriptors, or group ID descriptors. Within the message packet field, a message field can further include a target descriptor and the actual message content. The actual message content can be any number of things including text messages, picture files, sound files, vehicle subsystem program files, video files or other file or data types. Within the target descriptor can be various types of fields depending on the type of message being sent. If a message type using VIN descriptors is used, then the target descriptor contains 1 through N descriptors. If a message type using a Subscriber ID descriptor(s) is used, then the target descriptor can contain an SLIST. If a message type using a Hardware ID descriptor(s) is used, then the target descriptor can contain an HLIST. If a message type using Group ID descriptors is used, then the target descriptor can contain a GLIST. The SLIST, HLIST, or GLIST can be a predetermined length descriptor.

A method 600 of vehicle message addressing can include the step 602 of receiving targeted messages intended for a predetermined subset of subscribers associated with a vehicle having a vehicle identification number, assigning targeted messages from a predetermined manufacturer to a predetermined channel at step 604, and encoding the addresses of the targeted messages to the predetermined subset of subscribers using a vehicle identification number or a portion of the vehicle identification number at step 606. The method 600 can further include the step 608 of transferring the targeted messages and encoded addresses to a satellite uplink and transmitting the targeted messages and encoded addresses to one or more satellites for retransmission to a predetermined satellite coverage area. At step 610, the method 600 can further transmit the targeted messages and encoded addresses to a plurality of selective call receivers associated with vehicle identification numbers and determine at step 612 if a received address is based on a vehicle identification number. At step 614, the method can decode a targeted message to a specific vehicle identification number if the received address matches a stored address containing the specific vehicle identification number and alternatively decode a group targeted message to a range of vehicle identification numbers if the received address matches a stored address containing portions of the vehicle identification number. Decoding a broadcast message to all vehicles in one example can be done if the received address has wildcard data that matches a stored address. As noted above, the VIN can be stored locally or optionally obtained via a vehicle's communication bus. The method 600 can further include the step 616 of determining if the received address is based on a subscriber identifier, a hardware identifier, a group identifier, the vehicle identification number or any combination thereof. Note, the step of encoding can be done by addressing a message to a single vehicle identification number, to multiple vehicle identification numbers using wildcards, or to a plurality of vehicle identification numbers using a range of vehicle identification numbers.

A message delivery protocol as illustrated can enable, for example, individual message delivery to a car radio (e.g., text message), or delivery to multiple VINs using wild card capabilities or using a designation of ranges. The message applications can include command and control messages, service message deliveries (e.g., for opening car doors, trunks or other functions), file downloads, text, audio, image and video messages, or promotional messages (e.g., JPEG image of new models). Another message application can include software updates for "Y" Year designated vehicles or a range of VINs, for example.

The description above is intended by way of example only and is not intended to limit the present invention in any way except as set forth in the following claims.

We claim:

1. A method of vehicle message addressing, the method comprising the steps of: receiving, from a manufacturer, at least one targeted message intended for a predetermined subset of subscribers, wherein each subscriber of the predetermined subset of subscribers is associated with a vehicle that comprises a specific vehicle identification number; assigning the received at least one targeted message to a predetermined channel for transmission over a satellite or communications network; and encoding an address of the received at least one targeted message to address the predetermined subset of subscribers by encoding the address with at least a portion of a first vehicle identification number, the portion corresponding to a plurality of vehicle identification numbers, said plurality of vehicle identification numbers including the specific vehicle identification number of each vehicle of the predetermined subset of subscribers, wherein the encoding is performed by addressing the at least one targeted message to at least one of a single vehicle identification number, multiple vehicle identification numbers using wildcards, a plurality of vehicle identification numbers using the range of addresses, and a combination of a vehicle identification number and hardware identification number.

2. The method of claim 1, further comprising—transferring the at least one targeted message containing the encoded address to a satellite uplink; and transmitting the at least one targeted message containing the encoded address to one or more satellites for retransmission to a predetermined satellite coverage area.

3. The method of claim 1, further comprising:
transmitting the at least one targeted message containing the encoded address to at least one selective call receiver of a plurality of selective call receivers, wherein each selective call receiver of the at least one selective call receiver is associated with a specific vehicle identification number; determining at the at least one selective call receiver if the message is of a vehicle identification number type; and decoding with the at least one selective call receiver, the at least one targeted message containing the encoded address when one of the encoded address comprises a stored address containing a specific vehicle identification number; and the encoded address comprises a range of addresses that comprises the stored address containing the specific vehicle identification number.

4. The method of claim 3, further comprising decoding with the at least one selective call receiver the at least one targeted message containing the encoded address when the encoded address comprises wildcard data that matches the stored address containing the specific vehicle identification number.

5. The method of claim 3 further comprising determining~with the at least one selective call receiver whether the encoded address of the at least one targeted message containing the encoded address is based on at least one of a subscriber identifier, a hardware identifier, or a group identifier.

6. The method of claim 1, wherein the encoding the address comprises using at least one of a particular vehicle identification number, a range of values for at least one character of the first vehicle identification number, and a wildcard value for at least one character of the first vehicle identification number.

7. The method of claim 6, wherein the range of values corresponds to a sequence of vehicle identification numbers.

8. The method of claim 1, further comprising:
transmitting the at least one targeted message containing the encoded address to at least one selective call receiver of a plurality of selective call receivers.

9. The method of claim 8, wherein the at least one selective call receiver comprises at least one of a satellite digital audio radio receiver, a terrestrial frequency modulated radio receiver, and a cellular radio receiver.

10. The method of claim 9, wherein each selective call receiver of the at least one selective call receiver is associated with a specific vehicle identification number.

* * * * *